2,826,482

PROCESS FOR FORMING ALKALI METAL SILICATES

Frank L. Laymon and James L. Foster, Painesville, Ohio, assignors to Diamond Alkali Company, Cleveland, Ohio, a corporation of Delaware No Drawing. Application October 22, 1953
Serial No. 387,789

7 Claims. (Cl. 23—110)

This invention relates to the production of technically anhydrous crystalline alkali metal silicates. More particularly, the invention is concerned with a new process of making materials wherein the ratio of, for example, $Na_2O:SiO_2$ is between 1.65 to 2.25:1; of especial interest is material of the orthosilicate ratio, i. e., 2:1, or approximately so. The invention is concerned also with new products made in accordance with the process. The invention contemplates that the alkali portion of the compositions under consideration may be any of the alkali metals, including lithium, sodium, potassium, cesium, or rubidium, though of course, the recognized commercial compounds are usually sodium silicates. Hereinafter, reference will be made only to sodium compounds, it being understood that all alkali metals are included. Moreover, except where otherwise indicated herein, reference will be made to the orthosilicate ratio material as that is normally of major industrial interest.

Materials of this general type are now well established in the art and may be prepared by several different processes. In the strict sense, they are not true chemical compounds; rather, they are intimate associations of caustic soda and sodium metasilicate, caustic soda being present in sufficient quantity to provide the 2:1 ratio. It seems, therefore, that to describe them as orthosilicates is improper, but since this usage of the term is now well understood by those skilled in the art, it is not believed that any misunderstanding will result from its use herein. These materials vary somewhat in properties, depending upon the process that is employed to produce them. Generally, it is quite desirable that the products be readily water-soluble because they are used in such large quantities that dissolution time is of considerable importance to large quantity consumers. Another property desirable in these materials is that they remain in the solid phase at high temperatures so that they may be used as, for example, high temperature lubricants, in which phase they function more efficiently as lubricants. Presently known products cannot be said to be unsatisfactory in either of these respects, but as there remains an area admitting of improvements, of course, it is desirable to effect such improvement. The present invention is concerned with such improvement, and, as will now appear, still another problem which, because of its more pressing character, should be noted especially carefully.

A property of these materials which heretofore has presented great difficulty is that of deliquescence. Producers of these materials struggle at great pains to prepare a dry, discrete, free-flowing product, admirably suited to industrial needs, only to find that it is insatiably and avidly deliquescent. This property evidently is irrepressible, and consequently the manufacturer is faced with avoiding it. As illustrative of conditions that are experienced in handling these materials, it is found by exposing three different similar products, all of which were stated by their manufacturers to be anhydrous orthosilicate, to the atmosphere that within the span of twenty-four hours, they had increased in weight from about thirty-three percent to about fifty percent. In two cases, which showed an increase in weight of about one-third, the product had become wet and caked. The product which had increased in weight by approximately fifty percent was a slushy mass. These products were affected by the increase in water content long before the passing of twenty-four hours; they had begun to agglomerate visibly in a few hours and were unsatisfactory for their intended use. Water absorption at this rate requires that the product be packaged in expensive sealed waterproof containers, substantially immediately upon formation; otherwise, the product not only becomes difficult to package; but its ultimate use is seriously impeded. Preferably, packaging is carried out in a dry atmosphere, and shipping and storage containers are waterproof. The consumer must store opened containers under dry conditions or the contents will absorb sufficient water to agglomerate, whereupon great difficulty is encountered in removing the contents and bringing it into solution. These factors importantly decrease the usefulness of the product, thus depreciating its commercial worth, and they increase its cost. Thus, the property of deliquescence is one which most desirably should be controlled, from both the standpoints of the producer and user of the product. It is not believed that prior artisans have reported success in their attempts to eliminate the problem of deliquescence in sodium orthosilicates. The solution seems necessarily to lie in the manufacturing process, since, once the product is formed, its properties are determined, especially as regards its deliquescent character.

Attempts to make or improve the product have spawned several different processes of manufacture. In general, these processes differ widely, although all of them employ silicon dioxide and sodium oxide-containing materials and naturally it is not unexpected that some processes enjoy merit greater than others. Generally, it is desirable to avoid high temperatures because of the necessary heat energy and heavy equipment which is required; moreover, high temperature melts are quite corrosive and they tend to acquire impurities that result in the presence of insolubles in the product. The use of anhydrous caustic is not desirable because of its increased cost, which results from the expense of dehydration, and its shipping requirements, important among which requirements is that it be packaged in individual steel drums, it not being possible to ship it in bulk form as, for example, in tank or freight car quantity. Most, if not all, prior processes employ high temperatures and use anhydrous caustic in the formation of these materials. In most of these processes, the product must after formation be reduced to particle size by grinding since the product is obtained by fusion of raw materials followed by solidification into a monolithic mass. It might be appropriate to point out that in many instances of efforts toward new processes and products, it was hoped that the true orthosilicate chemical compound might be produced, as this has been an objective of experts in the art for many years. However, no commercial process is known by which this chemical may definitely be formed, and there is question as to whether such species exists. The hope accompanies the seeking of this material, that it will fulfill additional requirements of the industry for a product having sodium oxide and silicon dioxide in the orthosilicate ratio.

The process of this invention does not produce the true orthosilicate. However, two products are produced which have greatly improved properties over known materials and the process which is involved is believed to be much superior to any known process by which similar products are prepared.

It might not be appreciated that materials of the character sought in this invention are extremely difficult to produce by using sodium hydroxide in other than substantially anhydrous form. Those skilled in the art are aware of the fact that they do not form simply by manipulating mixtures which comprise sodium oxide and silicon dioxide in the desired ratio. On the contrary, repeated efforts to form ortho ratio materials by different combinations of silicon dioxide and sodium oxide-containing materials result too often in failure. In some cases the mixture cannot be caused to crystallize at all, and in others, crystallization is effected only in commercially unacceptable yields. This may be better appreciated upon recalling that the materials here produced are substantially anhydrous in character, and, therefore, are not formed from relatively dilute water solutions. Oftentimes it is not at all difficult to bring about crystallization of a substantial part of a system and leave therein a caustic-containing mother liquor. However, surprising as it may seem, repeated attempts to form crystals of the same, or even about the same, $Na_2O:SiO_2$ ratio from an identical liquor under the same conditions are by no means successful. To restate this more directly, it appears, except in rare instances, impossible to produce consistently the same crystalline material from two identical liquors under identical conditions. These observations, it is believed, are well-known to those engaged in manufacturing silicates and they are generally not thought to have a precise explanation. Of course, it is important that processes produce consistently the same products; otherwise, the producer could not engagte in their manufacture on a commercial scale without proceeding with analytical work upon each preparation so as to be able to indicate at the time of sale their true chemical descriptions. Ordinarily, such procedure is not tolerable; rather, generally, it is desirable to operate a process which does in fact provide a product that does not vary in description except within small acceptable limits. Although this difficulty does truly exist, it is encouraging to find that by the process of this invention, consistent results are achieved.

This invention has as an object, among other of its objects, to provide a process and products which shall be substantially free of such disadvantages and difficulties. Accordingly, it is desired to proceed with a description of the process of the invention and then to describe more fully the resulting products and point out their advantages.

According to the process of this invention, technically anhydrous crystalline sodium silicates containing sodium oxide and silicon dioxide in the ratio of approximately from 1.65:1 to 2.25:1, and specifically including the orthosilicate ratio of 2:1, are produced by combining a sodium silicate of the waterglass family and a caustic soda solution which may have any desired concentration, preferably within the range of 10% (approximately the electrolytic cell liquor of commerce) and 73%. For convenience, at this point, the starting materials are referred to as waterglass and 50% caustic soda, this caustic soda concentration being preferred only because it is readily available as a commercial product.

Waterglass and caustic soda are combined in proportion to provide a $Na_2O:SiO_2$ ratio of at least about 3:1. Moreover, the evaporation necessary to provide the desired crystalline material of the invention, while perfectly possible in extremely high ratios of $Na_2O$ to $SiO_2$ at this point in the process, renders the process somewhat unattractive commercially if the initial ratio of $Na_2O$ to $SiO_2$ of the originally constituted mixture runs much above $10Na_2O$ to $1SiO_2$. An even more suitable ratio and the preferred range for the practice of the invention is the combination of waterglass and sodium hydroxide to provide an initial percent by weight of about 8.4% to 37.8% $Na_2O$, 1.6% to 12.2% $SiO_2$ and 90% to 50% $H_2O$, the combination to make 100%. As may be calculated, the resulting $Na_2O:SiO_2$ ratio of such mixture is about 3.0 to 5.0:1.

In any case within the range stated and including the preferred range, the mixture is evaporated to a solids content of between 50% and 60%. This evaporation is satisfactorily accomplished by boiling the solution mixture to an end point temperature which is related to the initial $Na_2O:SiO_2$ ratio. In general, the higher the $Na_2O:SiO_2$ ratio, the higher the temperature necessary to achieve the desired solids content at which the desired crystal will be thrown down. Within the range of 3:1 to 10:1 temperatures from about 150° C. to about 193° C. will be the suitable end points. Preferred are end points between 150° C. and 160° C. which correspond to the above referred to preferred initial composition of $Na_2O$ to $SiO_2$ ratio of 3 to 5:1. The most advantageous conditions and the specifically optimum operation of the invention as best understood at this time encompasses a ratio of about $4.2Na_2O$ to $1SiO_2$ in the initially composed solution and a boiling end point of about 156° C. to 158° C.

Whatever the original constitution and the corresponding boiling end point, the system is then cooled rapidly to a temperature below about 90° C. It is next allowed to set under room temperature conditions until crystallization of the mass takes place. Crystallization is usually substantially complete within two hours or less. The resulting crystals analyze about 1.6–1.8:1 as regards sodium oxide and silicon dioxide ratio. This material, of course, is not the orthosilicate of the invention. However, as will appear at a later point herein, this product is useful and valuable.

After the crystals have formed, the entire system, including the residual mother liquor, is centrifuged or filtered by other known means in order to separate crystals from liquor. The crystals may be reworked with a quantity of the mother liquor, or other suitable caustic liquor, to increase the ratio of sodium oxide to silicon dioxide to the desired ratio within the range of 1.65:1 to 2.25:1. The caustic liquor concentration or the concentration of the mother liquor in caustic value is not critical but should not be less than about 25% NaOH by weight in order to avoid introduction of excessive water back into the product. A concentration of around 50% is preferred, as it not only represents the composition of the mother liquor and an available commercial product, either of which may be used, but it results in a moist crystal mass of the most desirable handling qualities. Simple admixture of the crystals and caustic liquor with sufficient agitation to prevent formation of too large agglomerates is satisfactory. It is found that by these means the initial product absorbs the entire quantity of added caustic to form small, spheroidal, discrete crystalline bodies of the order of about two to five mm. in diameter. Absorption is extremely rapid. The material that is formed may, if desired, be screened to provide a mass of crystals below a desired size which are then dried at approximately 100° to 175° C. to remove adhering water. The most surprising characteristic of the product made in accordance with this procedure is that though it gains weight in the presence of moisture laden air, it remains free-flowing after long exposure to such atmosphere and, therefore, is not hygroscopic in the usually understood sense of the term. It does not cake or become slushy as do other products.

As to the process, numerous batches prepared according to this procedure show that the crystallized product, which is formed initially by treating the starting materials, is produced with unfailing regularity, whereas, it is found almost impossible to achieve this result by other combinations of materials. This result will be more fully appreciated if, in considering the phenomenon, it is borne in mind that the process of this invention is one of crystallization leading to the formation of small distinct bodies, and that it is not a mere fusion or coalescence of caustic and silicon-containing materials, as is the case in prior art processes which form kindred materials. The distinct advantage of avoiding the necessity for grinding and the expensive equipment which grinding requires is a feature of the present invention.

In order that the invention may be better illustrated and possibly more completely understood, there follows hereinafter a specific example wherein additional detail is set forth.

Example 1

To 1800 g. of a water solution of sodium silicate having an $Na_2O:SiO_2$ ratio of about 1:3.22 by weight, the solids content of the solution averaging about 38.8% by weight, the remaining parts to 100 being water, are added 5580 g. 49.6% caustic soda to provide a liquor in which the $Na_2O:SiO_2$ ratio is about 4.21:1. The percentages of $Na_2O$, $SiO_2$ and $H_2O$ in this liquor are 31.6%, 7.2% and 61.2% respectively, the percentages being by weight. The liquor is then evaporated until the temperature of the liquor is about 156° to 158° C., approximately 25.8% by weight water being removed by the evaporation. The liquor, which is of necessity crystal clear at this point, is cooled rapidly to about 65–70° C., the time of cooling being about ten minutes. During cooling, the mass is preferably stirred slowly to hasten dissipation of the heat, though such is not necessary and, in case the stirring is too rapid, it is found to be undesirable because crystallization sets in prematurely with formation of extremely fine crystals from which it is almost impossible to extract the mother liquor. The cooling step is carried out preferably within about 10–20 minutes, rapid cooling tending to assist in the formation of large crystals. When a temperature of about 65–70° C. is reached, or shortly thereafter, crystallization takes place without further attention and is substantially complete within about an hour. The mass that results is a mixture of crystals and mother liquor. The mother liquor is then thoroughly admixed with the crystallized mass to form a slurry which is then delivered to a centrifuge and there extracted to remove as much of the mother liquor from the crystals as is possible. Crystal size, as suggested above, is important at this stage in the procedure, and if the crystals are too fine, great difficulty is encountered in extracting the mother liquor. In the procedure of this example, however, such difficulty is avoided as the bodies that are produced are for the most part of a size similar to that of common granulated sugar. The crystals analyze about 1.68 molecular parts $Na_2O$ to 1 molecular part $SiO_2$, the moist crystalline mass weighing about 1850 g. This material, as recovered at this point, has uses in the arts where a silicate of somewhat more siliceous nature is desired.

The mother liquor, which is separated from the crystals analyzes about 51.5% sodium hydroxide, and, of course, it is substantially devoid of silicon dioxide. In order to obtain the more highly alkaline composition of this invention, the centrifuged crystalline mass is combined with 49.6% NaOH in quantity sufficient to provide a product having the 2:1 ratio of the orthosilicate, this quantity being about 400 g. The combining of the materials takes place with thorough mixing and the crystals absorb the NaOH quite readily to form a moist, crystalline product consisting of small, spheroidal agglomerates. The mass is then heated at about 110° C. to dry the crystals so that they flow freely. The product is found to have greater solubility than any known similar product, it remains solid when heated to as high as 1900° F. and remains free-flowing for long periods of time of exposure to the open air. For example, the product may be exposed to the atmosphere for a month, after which it still flows freely.

Analysis of the initial crystalline product that is obtained at the centrifuge reveals a product comprised of sodium sesquisilicate and co-crystallized sodium hydroxide in quantity sufficient to increase the $Na_2O:SiO_2$ ratio from the 1.5:1 ratio of sesquisilicate to that of the product, namely, about 1.68:1. Analysis of the final product reveals an $Na_2O:SiO_2$ ratio of 2:1, sodium sesquisilicate still appearing as the dominant chemical compound.

By slight variations of the techniques of the foregoing example, slightly different products can be obtained. For example, if the crystallizing time is extended for several hours prior to delivery of the mass to the centrifuge, the $Na_2O:SiO_2$ ratio may be increased to about 1.72:1. However, no added advantage is found in products which have a ratio as high as 1.72:1, when compared to 1.65:1, and, therefore, the added time involved in its formation requires that the procedure of the example be followed in practical situations. Also, if this same mass is not cooled substantially uniformly to the specific preferable crystallization temperature, it is found that portions of the mass analyze to a ratio of, for example, 1.63:1.

The example specifies that the mixture is cooled to from about 65° to 70° C. This, of course, is the preferred temperature and, suitably, the temperature may range as high as 90° C. and still produce crystals that are workable. However, preferably, temperatures above 90° C. are to be avoided because it is found that when the liquor is cooled to only 90° C. and then not further treated, crystals which form are extremely fine, and, as indicated above, are undesirable.

It is found that the temperature to which the mass is evaporated initially is, as hereinabove noted, related to initial $Na_2O:SiO_2$ ratio. The specifically preferred ratio and temperature is about 4.2:1 and, as indicated in the example, about 156°–158° C.

Actual crystallization may take place by disposing the liquor in a variety of manners. Suitably, the cooled mass may be delivered to a continuously traveling belt where it would travel as a thin layer. This has the advantage of exposing substantially all parts of the liquor to the same conditions; it will be understood that crystallization in large vats involves the problem of undesirably wide temperature gradient, which, of course, leads to the formation of crystals under different conditions. However, wide temperature spread may be avoided by uniform cooling prior to crystallization, and the product which is produced is uniform as to analysis and suitable for industrial purposes. Additionally, crystallization may take place in pans containing the liquor as shallow layers, for example, about ¾ to 1 inch in depth. It is found that if the mass is spread to this depth with a small amount of seeding on the bottom of the pans, crystallization takes place in about 10 minutes. However, seeding of the entire mass, as by stirring seeds into it, is generally found to be undesirable, as thereby, it appears, that crystallization is prematurely initiated, the result being that crystals too finely divided are formed. Additionally, it is found that crystallizing the material as a layer less than about one-half inch in depth results in super-cooling which, again undesirably, cause crystals to form that are too small for practical handling, or it may result in a reluctance to crystallize at all.

Finally, it will be appreciated that once one has obtained the approximately 1.65:1 $Na_2O:SiO_2$ crystals, it is somewhat a matter of choice how much more caustic, as caustic solution or mother liquor, will be added to form materials having ratios higher than 1.65:1 and up to 2.25:1. The procedure for obtaining these intermediate materials is as in the example.

While there have been described various embodiments of the invention, the methods and products described are not intended to be understood as limiting the scope of the invention as it is realized that changes therewithin are possible and it is further intended that each element recited in any of the following claims is to be understood as referring to all equivalent elements for accomplishing substantially the same results in substantially the same or equivalent manner, it being intended to cover the invention broadly in whatever form its principle may be utilized.

What is claimed is:

1. A process for forming technically anhydrous sodium silicates wherein the ratio of sodium oxide to silicon dioxide is approximately 1.65:1 to 2.25:1 comprising, admixing a sodium silicate solution wherein the $Na_2O:SiO_2$ molecular ratio is of the order of about 1:1–3.4 and a sodium hydroxide solution of strength up to 73% in quantities calculated to produce a mixture having an $Na_2O:SiO_2$ ratio of at least about 3.0:1, evaporating said mixture to a solution temperature to provide a solids content of between about 50% and about 60%, allowing said mixture to set until crystallization is substantially complete, separating said mixture to form a mother liquor and to produce a moist crystalline residue, thereafter admixing with said residue sufficient caustic solution to increase the ratio of $Na_2O:SiO_2$ in the said residue to approximately above 1.65:1 but below 2.25:1 and drying the material so produced to a finely divided free-flowing crystalline mass.

2. A process for forming technically anhydrous sodium silicates wherein the ratio of sodium oxide to silicon dioxide is approximately 1.65:1 to 2.25:1 comprising, admixing a sodium silicate solution wherein the $Na_2O:SiO_2$ molecular ratio is of the order of about 1:1–3.4 and a sodium hydroxide solution of strength up to 73% in quantities calculated to produce a mixture having an $Na_2O:SiO_2$ ratio of at least about 3.0:1, evaporating said mixture to a solution temperature to provide a solids content of between about 50% and about 60%, allowing said mixture to set until crystallization is substantially complete, separating said mixture to form a mother liquor and to produce a moist crystalline residue, thereafter admixing with said residue sufficient caustic solution to increase the ratio of $Na_2O:SiO_2$ in the said residue to approximately 2:1 and drying the material so produced to a finely divided free-flowing crystalline mass.

3. A process as claimed in claim 1 wherein said sodium silicate solution and said sodium hydroxide solution are combined in proportions to produce an $Na_2O:SiO_2$ ratio of between about 3.0:1 and about 10.0:1.

4. A process as claimed in claim 2 wherein said sodium silicate solution and said sodium hydroxide solution are combined in proportions to produce an $Na_2O:SiO_2$ ratio of between about 3.0:1 and about 5.0:1.

5. A process as claimed in claim 2 wherein the said sodium hydroxide has a concentration of approximately 50%.

6. A process as claimed in claim 2 wherein the said sodium silicate solution comprises $Na_2O$ and $SiO_2$ in the ratio of 1 to about 3.22 parts by weight.

7. A process for forming technically anhydrous alkali metal silicates wherein the ratio of alkali oxide to silicon dioxide is approximately 1.6:1 to 1.8:1 comprising, admixing an alkali metal silicate solution wherein the alkali metal oxide:$SiO_2$ molecular ratio is of the order of 1:1.0–3.4 and a sodium hydroxide solution of a strength up to 73% in quantities calculated to produce a mixture having an alkali metal oxide:$SiO_2$ ratio of at least about 3.0:1, evaporating said mixture to a solution temperature to provide a solids content between about 50% and about 60%, and thereafter cooling said liquor to a temperature between about 65° and about 90° C., allowing said mixture to set until crystallization is substantially complete, separating the crystals thus obtained and admixing with said crystals sufficient alkali metal hydroxide solution to increase the ratio of alkali metal oxide to $SiO_2$ in the residue to above 1.65:1 but below 2.25:1 and drying the material so produced to a finely-divided free-flowing crystalline mass.

References Cited in the file of this patent

UNITED STATES PATENTS

| | | |
|---|---|---|
| 1,953,840 | Waddell | Apr. 3, 1934 |
| 2,100,944 | Davies | Nov. 30, 1937 |
| 2,206,289 | McDaniel | July 2, 1940 |
| 2,582,206 | McDaniel | Jan. 8, 1952 |

OTHER REFERENCES

Vail: "Soluble Silicates," vol. I, Monograph Series No. 116, 1952, pages 30, 32, 112. Published by Reinhold Publishing Co., New York, N. Y.